(12) United States Patent
Meijer et al.

(10) Patent No.: US 7,647,522 B2
(45) Date of Patent: *Jan. 12, 2010

(54) OPERATING SYSTEM WITH CORRECTIVE ACTION SERVICE AND ISOLATION

(75) Inventors: Henricus Johannes Maria Meijer, Mercer Island, WA (US); Raymond E. Ozzie, Seattle, WA (US); Gary W. Flake, Bellevue, WA (US); Thomas F. Bergstraesser, Kirkland, WA (US); Arnold N. Blinn, Hunts Point, WA (US); Christopher W. Brumme, Mercer Island, WA (US); Michael Connolly, Seattle, WA (US); Dane A. Glasgow, Medina, WA (US); Alexander G. Gounares, Kirkland, WA (US); Galen C. Hunt, Bellevue, WA (US); James R. Larus, Mercer Island, WA (US); Matthew B. MacLaurin, Woodinville, WA (US); David R. Treadwell, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

This patent is subject to a terminal disclaimer.

(21) Appl. No.: 11/613,241

(22) Filed: Dec. 20, 2006

(65) Prior Publication Data

US 2008/0082857 A1   Apr. 3, 2008

Related U.S. Application Data

(63) Continuation-in-part of application No. 11/536,573, filed on Sep. 28, 2006.

(51) Int. Cl.
*G06F 11/00* (2006.01)

(52) U.S. Cl. ......................................................... 714/3

(58) Field of Classification Search .................. 714/2–4, 714/10–13, 15–21, 37–39, 47–49
See application file for complete search history.

(56) References Cited

U.S. PATENT DOCUMENTS 5,263,165 A    11/1993   Janis (Continued)

FOREIGN PATENT DOCUMENTS

WO    2005022826    10/2006

OTHER PUBLICATIONS

Brunner, et al. "Disruption Tolerant Networking" Dagstuhl Seminar Proceedings (2005) NEC Europe Ltd., Network Labooratories, 4 pages.

(Continued)

*Primary Examiner*—Nadeem Iqbal
(74) *Attorney, Agent, or Firm*—Lee & Hayes, PLLC

(57) ABSTRACT

The claimed subject matter provides a system and/or a method that facilitates re-locating a web application associated with a network service utilizing a portion of serialized data. The network service can be any collection of resources that are maintained by a party (e.g., third-party, off-site, etc.) and accessible by an identified user over a network (e.g., WAN, Internet, etc.). A receiver component can receive a request for initiating and execution of a process that is maintained by the network service. A servicing component can analyze representations of multiple processes within the network service and determines whether to enable initiation and execution of the process based at least in part upon the analysis.

20 Claims, 12 Drawing Sheets

U.S. PATENT DOCUMENTS

| | | | |
|---|---|---|---|
| 5,537,404 | A | 7/1996 | Bentlet et al. |
| 5,606,659 | A * | 2/1997 | Maaloey .................... 714/25 |
| 6,064,656 | A | 5/2000 | Angal et al. |
| 6,195,683 | B1 | 2/2001 | Palmer et al. |
| 6,209,039 | B1 | 3/2001 | Albright et al. |
| 6,226,260 | B1 | 5/2001 | McDysan |
| 6,263,452 | B1 | 7/2001 | Jewett et al. |
| 6,341,127 | B1 | 1/2002 | Katsube et al. |
| 6,363,411 | B1 * | 3/2002 | Dugan et al. ................ 709/202 |
| 6,434,532 | B2 | 8/2002 | Goldband et al. |
| 6,469,991 | B1 | 10/2002 | Chuah |
| 6,496,482 | B1 | 12/2002 | Kubota |
| 6,654,903 | B1 * | 11/2003 | Sullivan et al. ................ 714/4 |
| 6,707,820 | B1 | 3/2004 | Arndt et al. |
| 6,745,224 | B1 | 6/2004 | D'Souza et al. |
| 6,779,030 | B1 * | 8/2004 | Dugan et al. ................ 709/223 |
| 6,917,975 | B2 | 7/2005 | Griffin et al. |
| 6,961,318 | B2 | 11/2005 | Fichou et al. |
| 7,002,926 | B1 | 2/2006 | Eneboe et al. |
| 7,043,728 | B1 * | 5/2006 | Galpin ....................... 718/102 |
| 7,065,041 | B2 | 6/2006 | Sen |
| 7,278,130 | B2 * | 10/2007 | Iborra et al. ................ 717/101 |
| 2002/0124053 | A1 | 9/2002 | Adams et al. |
| 2002/0152306 | A1 * | 10/2002 | Tuck, III .................... 709/224 |
| 2003/0105734 | A1 | 6/2003 | Hitchen et al. |
| 2003/0229623 | A1 | 12/2003 | Chang et al. |
| 2004/0076160 | A1 | 4/2004 | Phaltankar |
| 2004/0098456 | A1 | 5/2004 | Kryzanowski et al. |
| 2005/0138419 | A1 | 6/2005 | Gupta et al. |
| 2005/0238024 | A1 | 10/2005 | Taylor et al. |
| 2005/0262132 | A1 | 11/2005 | Morita et al. |
| 2005/0289234 | A1 | 12/2005 | Dai et al. |
| 2006/0020700 | A1 | 1/2006 | Qiu et al. |
| 2006/0031518 | A1 | 2/2006 | Jennings |
| 2006/0036904 | A1 | 2/2006 | Yang |
| 2006/0048224 | A1 | 3/2006 | Duncan et al. |
| 2006/0062161 | A1 | 3/2006 | Tang et al. |
| 2006/0085557 | A1 * | 4/2006 | Ishijima ..................... 709/238 |
| 2006/0123005 | A1 | 6/2006 | Burnett et al. |
| 2006/0168494 | A1 * | 7/2006 | Trainin ...................... 714/758 |
| 2006/0248370 | A1 * | 11/2006 | Almasi et al. ................. 714/4 |
| 2006/0253588 | A1 | 11/2006 | Gao et al. |
| 2008/0082600 | A1 * | 4/2008 | Meijer et al. ................ 709/201 |

OTHER PUBLICATIONS

Fox, et al. "Towards Flexible Messaging for SOAP Based Services" (2004) IEEE, 11 pages.

Gunduz, et al. "A Framework for Aggregating Network Performance in Distributed Brokering Systems" (2000) Deptartment of Electrical Engineering & Computer Science, Syracuse University, 11 pages.

Chekuri, et al. "Building Edge-Failure Resilient Networks" (2002) Lucent Bell Labs, 18 pages.

Hota, et al. "Restoration of Virtual Private Networks with QoS Guarantees in the Pipe Model" (2004) GESTS International Transaction on Computer Science and Engineering, vol. 6 and No. 1, Journal ISSN No. 1738-6438, 12 pages.

Brightwell, et al. "Reserving Resilient Capacity in a Network" (2003) Networks 41, No. 2, 20 pages.

Duffield, et al. "A Flexible Model for Resource Management in Virtual Private Networks" (1999) ACM SIGCOMM Computer Communication Review vol. 29, Issue 4, 14 pages.

Create Buzz Marketing & Word of Mouth Marketing Campaigns. 2004-2005 Buzzoodle, A Liquid Learning Inc. Company. http://www.buzzoodle.com. Last accessed Sep. 20, 2006.

Seth Godin. Unleashing the Ideavirus. Do You Zoom, Inc., 2000.

James Surowiecki. The Wisdom of Crowds. Doubleday, 2004.

Sandhu, et al. Access Control: Principles and Practice. IEEE Communications Magazine, Sep. 1994.

System Management Concepts: Operating System and Devices, http://www.dlib.indiana.edu/doc_link/en_US/a_doc_lib/aixbman/admnconc/audit.htm. Last accessed Sep. 20, 2006.

Hughes, et al. Automated Verification of Access Control Policies. http://www.cs.ucsb.edu/~bultan/publications/tech-report04.pdf. Last accessed Sep. 20, 2006.

Cederquist, et al. An Audit Logic for Accountability. 2005. http://www.citebase.org/fulltext?format=application/pdf &identifier=oai:arXiv.org:cs/0502091. Last accessed Sep. 20, 2006.

Managed Network Services http://nsiretail.com/Content/Solutions/ManagedNetworks.aspx. Last accessed Nov. 28, 2008, 3 pages.

Enterprise Network Management an Operations Management Solution http://www.dimensiondata.com/NR/rdonlyres/92BF2D98-18D9-462B-A909-4457A19463F3/9585/NetworkandApplicationInsert1.pdf. Last accessed Nov. 28, 2008, 8 pages.

* cited by examiner

OPERATING SYSTEM WITH CORRECTIVE ACTION SERVICE AND ISOLATION

CROSS REFERENCE TO RELATED APPLICATION(S)

This continuation-in-part application claims the benefit of U.S. patent application Ser. No. 11/536,573 filed on Sep. 28, 2006, entitled "REMOTE NETWORK OPERATING SYSTEM." The entirety of which application is incorporated herein by reference.

BACKGROUND

Microprocessor-based devices have evolved into reliable and pervasive tools that facilitate everyday common tasks (e.g., microwave cooking, automobile ignition systems, entertainment centers . . . ), complex mathematical computations (e.g., trending, controlling a robot, forecasting . . . ), sophisticated applications (e.g., business workflow, word-processing, financial logging, electronic mail . . . ), etc. Such devices typically include one or more processors and various types of memory as well as other components that enable efficient and robust multi-tasking. Incremental advances in electronics, networking and software technologies have resulted in reduced device production costs that have correlated to decreased consumer purchasing costs, which has rendered computers (e.g., desktop, laptop, handheld . . . ) essentially ubiquitous throughout many portions of the world.

A large and ever-growing amount of computer software is readily available to consumers in light of such a dramatic increase in use, demand, availability, and decrease in cost associated with computers. Based on such vast and broad functionality associated with computers, computer software exists for essentially any market, activity, computation, and/or computer-related implementation. For instance, software can be related to accounting, word processing, data management, electronic mail message, virus protection, data synchronization, digital photograph manipulation, media management, Operating Systems (OS), update control, audio, graphic design, architecture, taxes, browsers, document readers, games, communications, security, networking, etc.

A typical computing machine is provided with software (e.g., an Operating Systems (OS)) that provides a framework to execute and/or build applications, view data, control apparatuses, etc. Traditional Operating Systems were developed under a single thread approach, wherein individual processes (e.g., tasks) are handled one at a time. For instance, if five processes were ready for execution, the CPU processes only one of the processes at any given time, while the remaining processes are queued for subsequent processing. Such systems commonly employed one or more mechanisms to interrupt processing and transparently re-use resources, for example, to handle higher priority processes. Yet, advances in the arts lead to introduction of a multithreaded-multitasking environment, which set forth a notion of concurrent execution of multiple processes or sub-processes.

However, conventional OSs typically can involve a plurality of complications, errors, problems, and inconveniences associated with security, software validation, versioning, data consistency, etc. For instance, machines that implement typical OSs frequently require installation and/or downloading of various patches, versions, definitions, and the like to ensure the quality and performance of the respective OS. The amount of updates and/or patches increases based on the identification of hundreds of threats, errors, etc. associated with OSs each day, which can correspond to the increase in OS complexity. Moreover, software and/or hardware manufactures struggle to provide products that are compatible with the numerous and disparate versions of OSs. Thus, providing a piece of functional software can be extremely difficult, let alone enable such piece of software to be functional across a variety of platforms while keeping development costs down. In other words, conventional Operating Systems (OSs) include a multitude of compatibility errors for software and/or hardware in addition to problematic characteristics related to versioning, security, validation, etc.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate analyzing at least a portion of a process representation in any state to ensure error reduction associated with initiating and execution of a process within a network service. A servicing component within a network service can receive a request associated with a process via an interface, wherein the servicing component can analyze at least one process representation within the network service prior to initiating the request in order to ensure an error-free environment. The servicing component can analyze a plurality of processes and respective states and/or previous states prior to enabling the initialization of the request. In addition, the servicing component can monitor the process while running. Such evaluation of the processes and/or process representations provides error reduction and heightened security within the network service. Upon the detection of an error and/or complication, the servicing component can provide any suitable action to correct such error (e.g., a roll back, a roll forward, a quarantine, an isolation, a repair, a deletion of error-related data, a termination of process, a cleaning, an ignore action, etc.). Moreover, when a potential problem has been identified before initialization, the process can be run in isolation and monitor it while running.

The network service can refer to any collection of resources that are maintained by a party (e.g., off-site, on-site, third party, etc.) and accessible by an identified user over a network (e.g., Internet, WAN, etc.). The network service is intended to include any service, network service, cloud service, collection of resources, etc. and can be accessed by an identified user via a network. In addition, the network service can provide any suitable number of service(s) to any suitable number of user(s) and/or client(s).

In accordance with one aspect of the claimed subject matter, the network service can employ an Operating System for a client. In particular, the Operating System can be a software program that manages the hardware and/or software resources associated with the network service. The network service can provide services for a plurality of clients, wherein each client can utilize a client-specific Operating System including particular client settings associated with data, applications, hardware, memory, processor, inputs, outputs, networking, etc.

In accordance with another aspect of the subject innovation, the servicing component can utilize a security component that verifies identify and/or integrity associated with a client and/or user. The security component can identify a client in order to identify and provide the correlating Operating System, data, processes, and the like to the client within the network service. For instance, a particular Operating System can be initiated for a client within a network service based at least in part upon the identification of such client.

In accordance with yet another aspect of the claimed subject matter, a rollback component can allow the Operating System incorporated within the network service to be transactional in nature, wherein a roll back and/or a roll forward can be utilized to correct and/or avoid errors and/or complications. Moreover, the servicing component can utilize a continuous component that allows an unimpeded execution of a request associated with the client regardless of a connectivity status. In other aspects of the claimed subject matter, methods are provided that facilitate implementing a particular Operating System that corresponds to a client within a network service to manage hardware and software resources of the network service.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
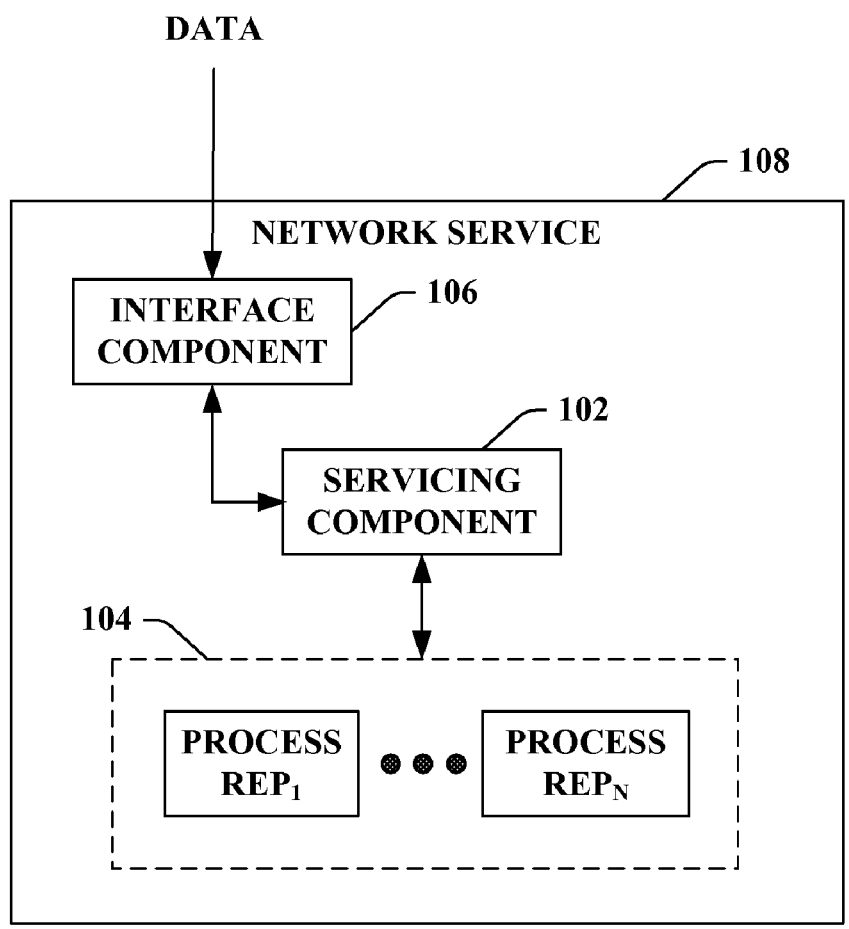
FIG. 1 illustrates a block diagram of an exemplary system that facilitates analyzing at least a portion of a process representation in any state to ensure error reduction associated with initiating and execution of a process within a network service.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "network," "cloud," "service," "Operating System," and the like are intended to refer to a computer-related entity, either hardware, software (e.g. in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

In addition, a "cloud" is intended to refer to a collection of resources (e.g., hardware and/or software) provided and maintained by an off-site party (e.g., third party), wherein the collection of resources can be accessed by an identified user over a network (e.g., Internet, WAN, . . . ). The resources can provide services including, without limitation, data storage services, word processing services, and many other services and/or applications that are conventionally associated with person computers and/or local servers. Thus, as utilized in the subject innovation, a cloud can provide a network service, a collection of resources, a portion of a service, and the like to at least one identified user. Moreover, such services and/or collection of resources can be specifically tailored to a particular user based on such identification data.

Now turning to the figures, FIG. 1 illustrates a system 100 that facilitates analyzing at least a portion of a process representation in any state to ensure error reduction associated with initiating and execution of a process within a network service. The system 100 can include a servicing component 102 within a network service 108 that can receive data via an interface component 106 (herein referred to as interface 106 and discussed in detail infra), wherein such data can be processed based at least in part upon an analysis associated with a portion of a process representation 104 to ensure a reduction of errors within such network service 108. In other words, the servicing component 102 can analyze a portion of process representations 104 prior to enabling any initialization related to the data received via the interface 106. It is to be appreciated that the data received can be executable code itself. For instance, the process can interpret that data, translate it to machine code, and/or load it for execution. In addition, the servicing component 102 can monitor the portion of process representation 104 while running. It is to be appreciated and understood that there can be any suitable number of process representations such as process representation$_1$ to process representation$_N$, where N is a positive integer. Thus, the servicing component 102 can analyze a plurality of process representations in order to ensure the reduction of any problematic and/or error prone situations before utilizing the data received. Moreover, it is to be appreciated that there can be any suitable number of network services and the subject innovation is not limited by the depiction of a single network service 108.

For example, the interface 106 can receive data associated with a request corresponding to a process. Conventional systems and/or methods initiate such request regardless of any data evaluation and/or determination due in part to the lack of resources, which in turn leads to a windfall of errors, crashes, faults, glitches, etc. However, by implementing the servicing component 102 to analyze at least a portion of process representations within the network service 108 prior to enabling such request, any errors and/or inconsistencies can be validated, corrected, isolated, allow to run with reduced/downgraded functionality, ignored, etc. providing optimized security and error reduction in comparison to conventional systems and/or methods. Moreover, when a potential problem has been identified before initialization, the process can be run in isolation and monitor it while running.

In another example, the network service 108 can provide a "cloud" of devices and services, such that requests by several clients can simultaneously be serviced within the cloud without a client/user noticing any degradation in computing performance. In particular, the network service 108 can provide a cloud of devices that can be associated with a robust Operating System (not shown), which includes intentional and complete representations of processes and entities within the "cloud." Therefore, for instance, each process that is currently undertaken (or may possibly be undertaken) can be represented within the Operating System within the network service 108. The representations can include representations of open connections, security contexts, processes, resources, etc. When a process is initiated, the servicing component 102 can reason over representations to ensure that errors will not occur or security will not be breached. In other words, most other processes and their current and/or previous states can be analyzed prior to enabling a process to be initiated, thereby reducing errors that occur within the cloud and/or network service 108.

In addition, the Operating System utilized by the servicing component 102 can be most any suitable software program that manages hardware and/or software resources associated with the network service 108. For example, the Operating System can perform basic tasks such as, but not limited to, controlling and allocating memory, prioritizing the processing of instructions (e.g. including loading code for execution, etc.), controlling input and/or output devices, facilitating networking, managing files and/or data, etc. It is to be appreciated that the system 100 can employ an Operating System to each client that is unique and specifically tailored accordingly within the network service 108. For instance, there can be five clients associated with the network service 108, wherein there can be five respective Operating Systems with distinct settings, configurations, and/or data related thereto that correspond to each of the clients. Thus, rather than having the five clients utilize five local Operating Systems in connection with the network service 108 (where each Operating System can be disparate in relation to version, patches, definitions, hardware, Operating System, etc.), the clients can utilize five remote Operating Systems that are integrated within the network service 108. By pushing the conventional Operating System paradigm to the network service 108, numerous issues and/or problems are mitigated (e.g., consistency, versioning, security, software validation, data accuracy, hardware limitations, etc.).

The servicing component 102 can further provide corrective actions in response to identifying most any errors, complications, and/or potential errors associated with the process representations associated within the Operating System. For instance, the servicing component 102 can identify at least one error, wherein such error can be corrected in a variety of ways such as, but not limited to, rollback technique, termination of process, ignored, quarantined, cleaned, repaired, isolated, allow to run with reduced/downgraded functionality, etc. Thus, the system 100 can ensure the detection and correction of most any errors identified during the analysis related to the process representations within the network service 108 allowing the reduction and/or elimination of errors and security breaches.

In one aspect in accordance with the claimed subject matter, the system 100 can provide a rollback mechanism that enables the network service 108 to be transactional in nature, such that data, processes, and the like can be rolled back to a previous and/or future state. Thus, the Operating System employed by the network service 108 and the servicing component 102 can be transactional and allow most any suitable rollback mechanism and/or technique to be implemented. For instance, if the servicing component 102 analyzes a portion of process representations 104 to identify an error and/or possible error, the system 100 can be rolled back to a state that allows such identified error to be validated, corrected, isolated, ignored, etc. In another example, the system 100 can be rolled forward to a state to allow the system to avoid anticipated errors. Therefore, if there is an error or a mistake has been made, the Operating System can roll back transactions (e.g. specific to a particular process or entity) to correct the mistake. In other words, the Operating System can be "self-healing" in nature.

In another aspect in accordance with the claimed subject matter, the system 100 can allow a continuous processing of data independent upon whether a respective owner of such data is connected (e.g. logged on) to the network service 108. In other words, a request from a client can be processed independent of client login status (e.g. logged in, logged out, in the process of logging in, in the process of logging out, etc.). For instance, a client can log onto the network service 108 and utilize an Operating System incorporated therewith. The client can initiate a request to be processed and before such request is complete, connection to the network service can be disrupted (e.g., connection lost, client log out, client timed out, network service connection lost, etc.). Yet, regardless of such disruption and/or status of the client, the request can be processed and completed. When the client re-establishes the connection with the network service 108, the request will be completed and/or have continued as if the client never had disruption in connection to the network service 108. In other words, the client need not be connected, communicating, and/or have a communication line established with the network service 108 in order to process most any data requests. Pursuant to another example, the user can request that a certain item be searched for, and can then disconnect from the cloud and/or network service 108. Processes and/or applications within the network service 108 and/or cloud, however, can continue to search for the item while the client is disconnected.

In general, the network service 108 can refer to most any collection of resources that are maintained by a party (e.g., off-site, on-site, third party, etc.) and accessible by an identified user over a network (e.g. Internet, WAN, etc.). It is to be appreciated and understood that the network service 108 is intended to include most any service, network service, cloud service, collection of resources, etc. and can be accessed by an identified user via a network. Moreover, the network service 108 can provide most any suitable number of services, Operating Systems, etc. In another example, the network service 108 can be a cloud service that can include and/or utilize the servicing component 102.

In addition, the system 100 can include most any suitable and/or necessary interface component 106 (herein referred to as "interface 106"), which provides various adapters, connectors, channels, communication paths, etc. to integrate the servicing component 102 into virtually most any operating and/or database system(s) and/or with one another. In addition, the interface component 106 can provide various adapters, connectors, channels, communication paths, etc., that provide for interaction with the servicing component 102, process representations 104, network service 108, data, and most any other device and/or component associated with the system 100.

Figure 2:
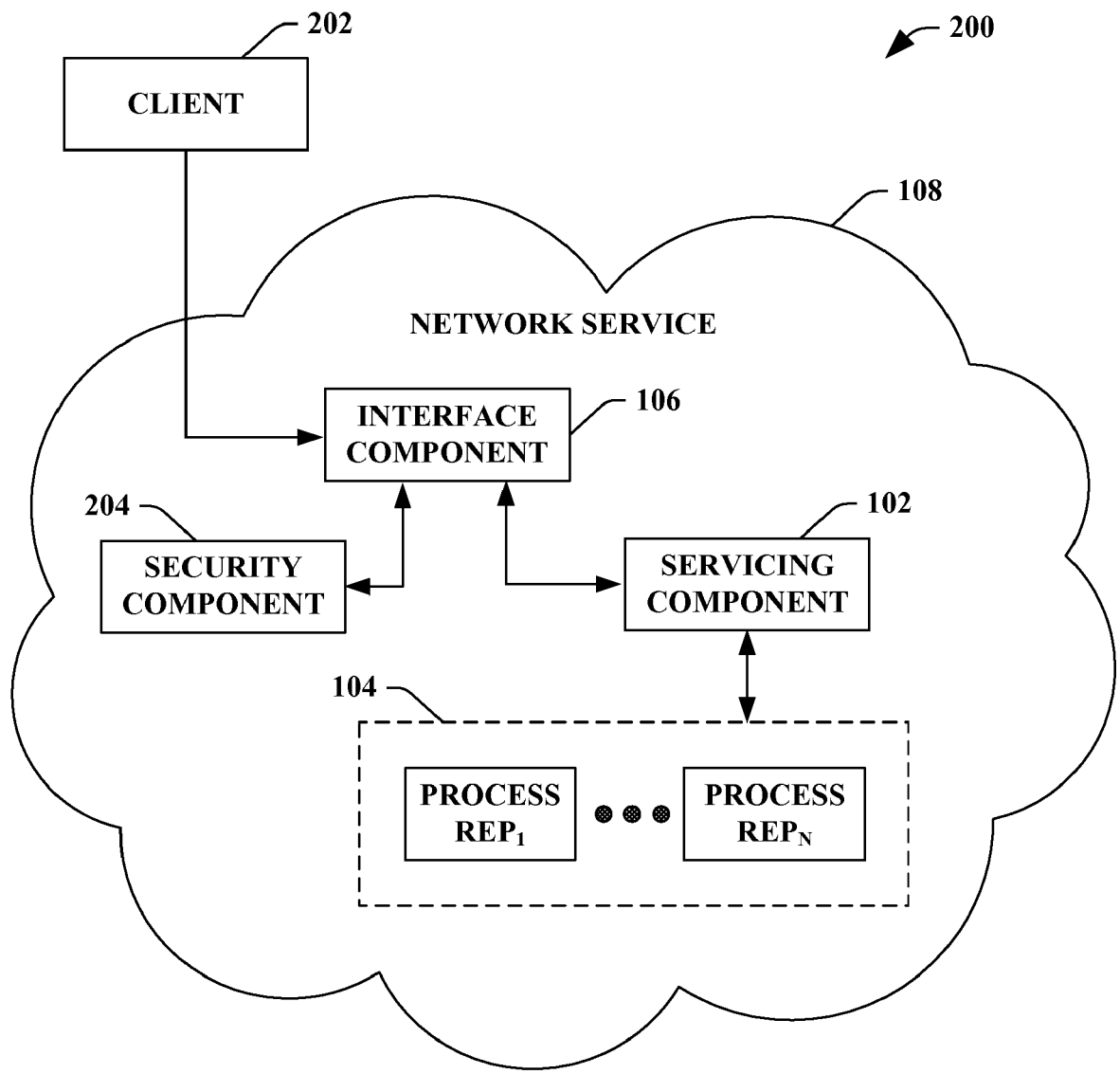
FIG. 2 illustrates a block diagram of an exemplary system that facilitates employing a plurality of granular security measures to identify a client and corresponding configurations and/or settings within a network service.

FIG. 2 illustrates a system 200 that facilitates employing a plurality of granular security measures to identify a client and corresponding configurations and/or settings within a network service. The system 200 can provide a robust Operating System incorporated within the network service 108 to manage hardware and/or software resources associated therewith. The system 200 can further include the servicing component 102 that can analyze at least a portion of the process representation 104 in order to ascertain whether or not a request received via the interface 106 can be executed and/or initialized within the network service 108. The request and/or data received can be related to a client 202, wherein the client can be most any suitable entity communicating with the network service 108. For instance, the client can be, but is not limited to being, a user, a machine, a computer, a portion of data, a signal, a wireless device, a disparate cloud process, a network service process, etc. With the servicing component 102 evaluating process representations prior to initiating a request from the client 202, the system 100 provides a robust Operating System with error-checking, prevention capabilities, and increased security measures. It is to be appreciated that the servicing component 102 can not only analyze the process representations 104, but can also utilize most any suitable prioritization associated therewith based on detected and/or identified criteria.

The system 200 can include a security component 204 that employs advanced security measures in relation to client 202 and accessibility to network service 108. In general, the security component 204 can verify the client 202 attempting to connect and/or establish a communication session with the network service 108 to ensure integrity of such client 202 and/or data associated therewith. Moreover, once identity of the client 202 is verified and/or approved, a plurality of user and/or client specific data can be enabled such as, but not limited to, respective Operating System, Operating System data, Operating System settings, application configurations, hardware specifics, software specifics, devices, inputs, outputs, memory, client configurations, aesthetics, client account details, client data, system settings, client settings, etc.

Furthermore, the security component 204 can ascertain which operations related to the network service 108 are authorized to execute. In accordance with one example, a user/client may only be authorized to perform a request and/or process, while not authorized to initiate disparate request and/or process. In another example, a user may be able to connect to a first network service 108, while not authorized to open a communication channel with a second network service (not shown). The security component 204 can determine user identity by analyzing, for instance, usernames, passwords, personal data, account data, personal identification numbers, personal status, historical data, login data, a personal piece of information, an Internet Protocol (IP) address, a digital certificate, and the like. Furthermore, the security component 204 can determine a user's identity by analyzing biometric indicia, such as voice recognition, fingerprint analysis, retina analysis, etc. By providing identification of a user, specific rights can be attached and/or associated therewith to allow a hierarchical rights structure to protect the integrity of most any data and/or data manipulation associated with the system 200.

Still further, the security component 204 can perform granular security with respect to a user, a portion of a network service, a collection of services, a user account, a network service, a cloud service, a service, etc. Pursuant to one example, a user's rights with respect to a particular Operating System can change as time alters. For instance, certain operations associated with an Operating System performed by a user can be allowable by the user during a first shift but not allowable to the user during a second shift. Additionally, the security component 204 can provide different measures of security given different states of data. Therefore, for example, a user may have rights with respect to data in a first state of the Operating System but may have different rights with respect to the same data in a second state of the Operating System.

Figure 3:
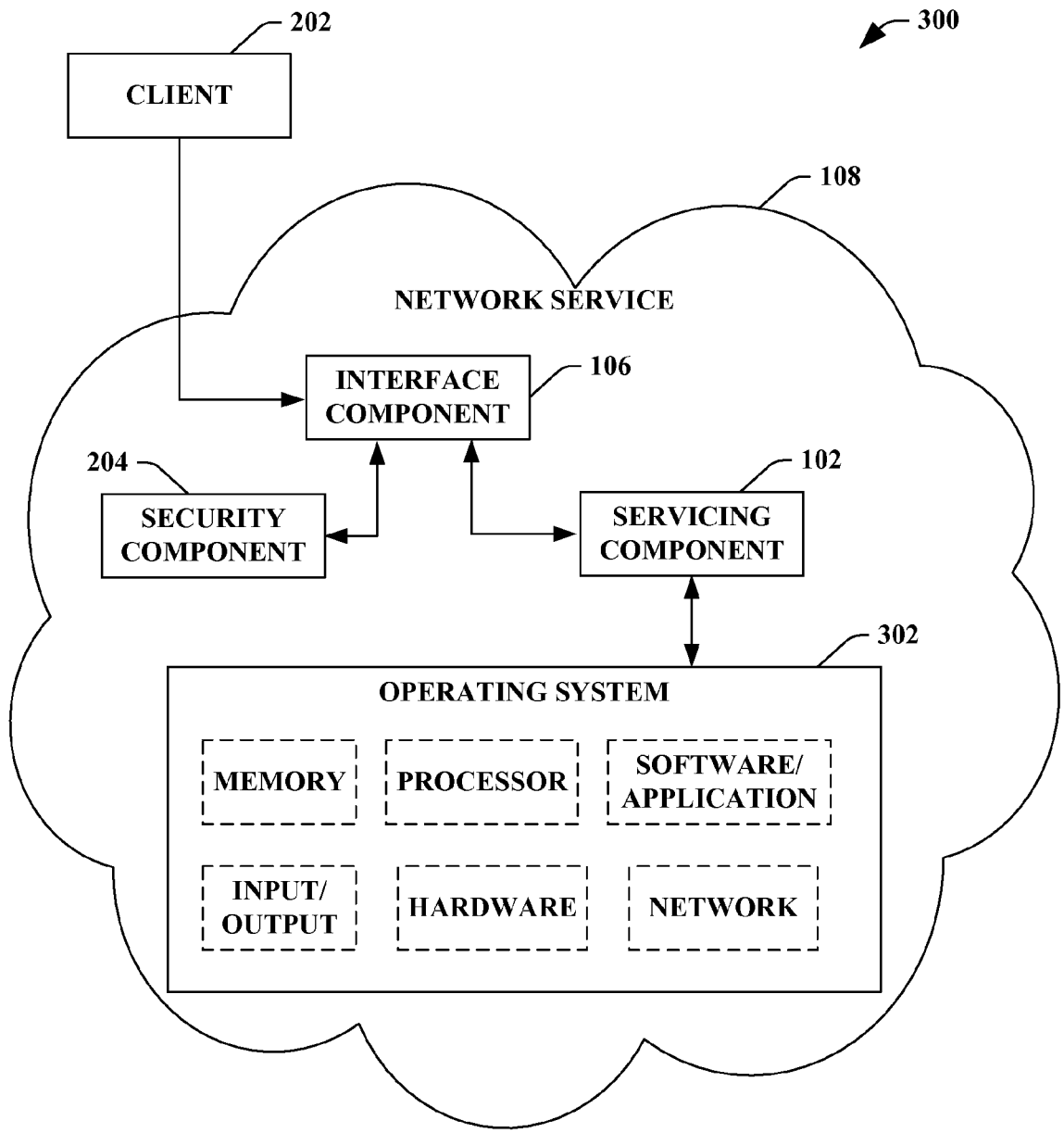
FIG. 3 illustrates a block diagram of an exemplary system that facilitates implementing a particular Operating System that corresponds to a client within a network service to manage hardware and software resources of the network service.

FIG. 3 illustrates a system 300 that facilitates implementing a particular Operating System that corresponds to a client within a network service to manage hardware and software resources of the network service. The system 300 can include the servicing component 102 that allows the implementation of at least one Operating System 302 to be utilized by the client 202. The client 202 can connect and/or open communications to the network service 108 allowing a plethora of services and/or applications to be provided. In particular, the client 202 can be authenticated utilizing the security component 204, wherein such authentication can allow the client 202 to utilize most any service and/or application related to the network service 108.

The network service 108 can further provide an Operating System 302 for the client 202. In general, the servicing component 102 can analyze any process representations employed by the Operating System 302 in order to provide optimized security and/or error reduction. The Operating System 302 can be any suitable software program and/or hardware that can manage hardware and/or software resources associated with the network service 108. For instance, the Operating System 302 can perform basic tasks in connection with the client 202 such as, but not limited to, controlling and allocating memory, prioritizing the processing of instructions, controlling input and output devices, facilitating networking, managing files and/or data, etc. Moreover, the Operating System 302 can include any suitable components, modules, and the like to provide adequate management of network service 108 resources. For instance, the Operating System 302 can utilize at least one of the following: memory, processor, software/application, input/output, hardware, network, etc.

Figure 4:
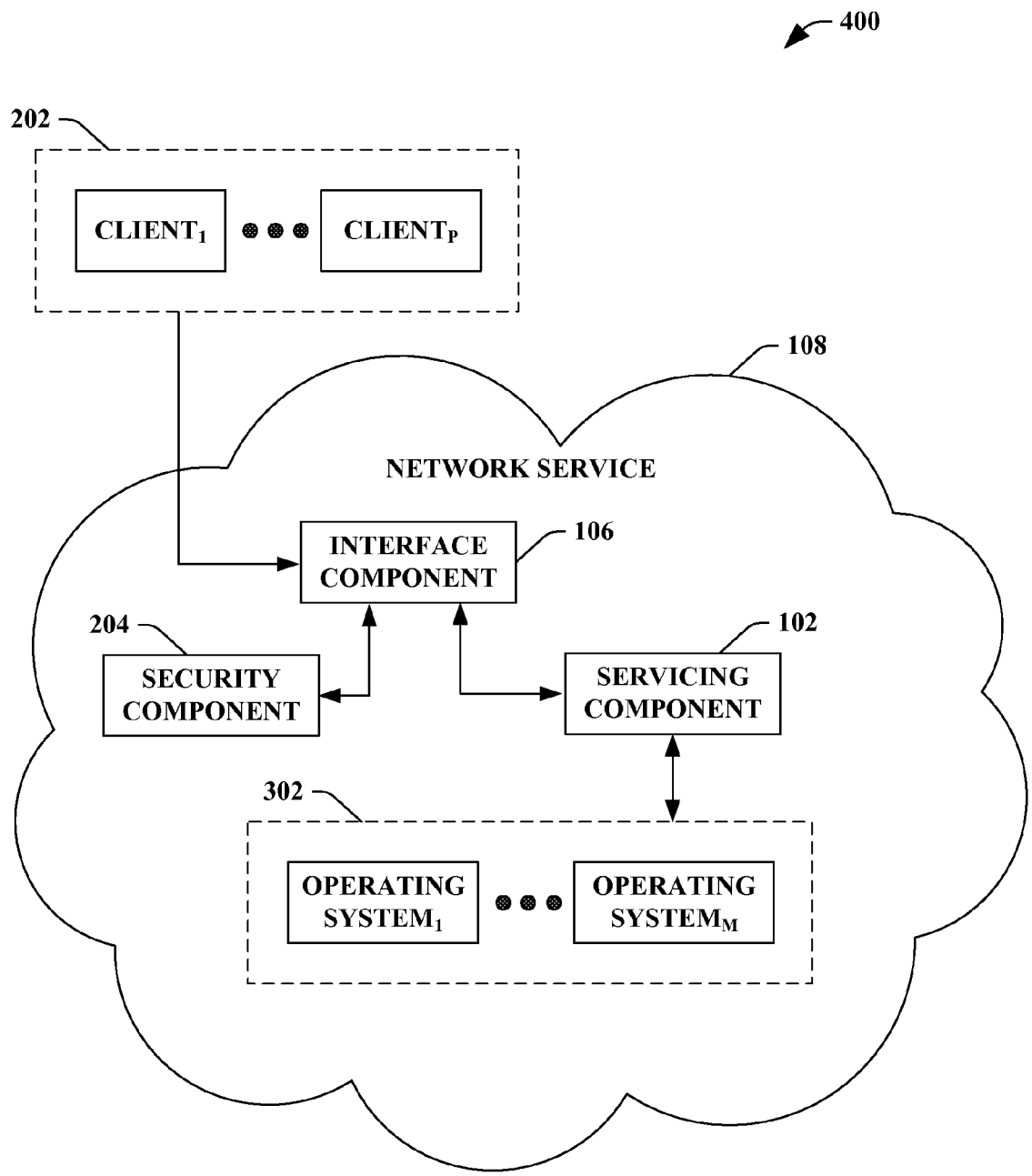
FIG. 4 illustrates a block diagram of an exemplary system that facilitates employing a plurality of Operating Systems for a multitude of clients within a network service.

FIG. 4 illustrates a system 400 that facilitates employing a plurality of Operating Systems for a multitude of clients within a network service. The system 400 includes the servicing component 102 that enables optimized security and enhanced error prevention within the network service 108. The network service 108 can incorporate an Operating System 302 to allow the management of resources within the network service 108, wherein the Operating System 302 can include a plurality of processes that can be represented within. The servicing component 102 can analyze process representations in order to ensure data integrity associated therewith prior to executing a request and/or process related to client 202. In addition, the servicing component 102 can monitor the process and/or request related to the client 202 while running. Moreover, the system 400 can provide security in connection to such client 202, wherein the client can be authenticated prior to communicating to the network service 108. It is to be appreciated that there can be any suitable number of clients, from $client_1$ to $client_P$, where P is a positive integer. Moreover, it is to be understood that a client can have at least one corresponding Operating System 302 that can be specific to such client (including data, hardware, settings, etc.).

In general, the network service 108 can refer to any collection of resources that are maintained by a party (e.g., off-site, on-site, third party, etc.) and accessible by an identified user over a network (e.g. Internet, WAN, etc.). It is to be appreciated and understood that the network service 108 is intended to include any service, network service, cloud service, collection of resources, etc. and can be accessed by an identified user via a network. Moreover, the network service 108 can provide any suitable number of Operating Systems 302 such as $Operating System_1$ to $Operating System_M$, where M is a positive integer. In another example, the network service 108 can be a cloud service that can include and/or utilize the servicing component 102.

Figure 5:
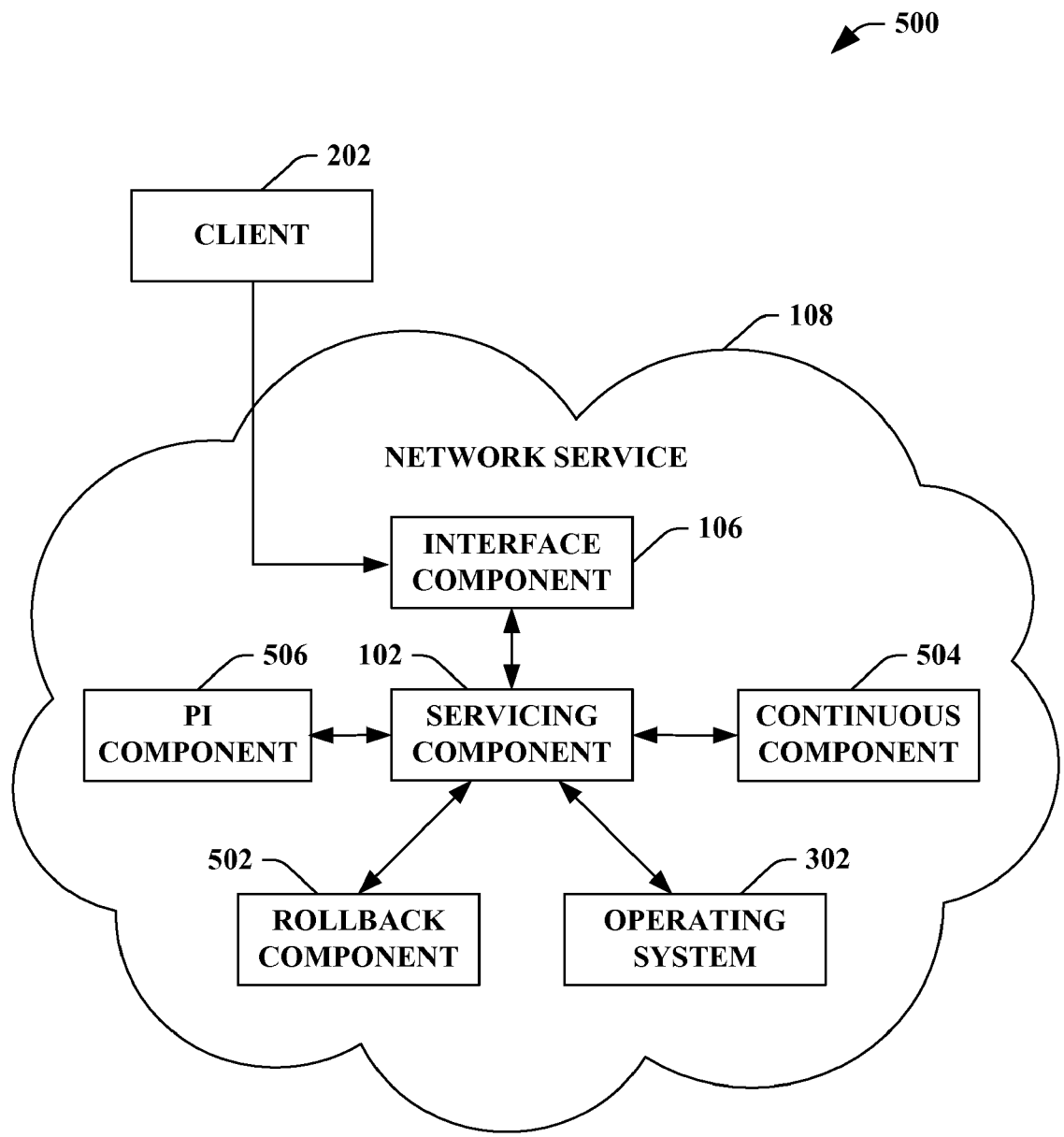
FIG. 5 illustrates a block diagram of an exemplary system that facilitates maintaining a process of a request independent of a client login status and utilizing a rollback mechanism for data within a network service.

FIG. 5 illustrates a system 500 that facilitates maintaining a process of a request independent of a client login status and utilizing a rollback mechanism for data within a network service. The system 500 can include a rollback component 502 that can allow the Operating System 302 to be transactional in nature such that any data, processes, representations of processes, and the like can be rolled to a prior and/or future state. Therefore, if an error or mistake has been made, the Operating System 302 can roll back and/or forward transactions (e.g., specific to a particular process or entity) to correct the mistake. In other words, the network service 108 and in particular, the Operating System 302, can be "self-healing" in nature. One other possible service is a redundancy service that can be associated with the rollback component 502. For example, on a space shuttle, parts of computer systems are setup as multiple machines each running independently, wherein each machine can vote and/or recommend an action. The final "answer" to any computation can be the majority vote of those machines. Thus, for the Operating System 302 every job can be run in multiple copies and if they agree continue as agreed. If no agreement is established, then rollback (or take some other action). Thus by providing the remote Operating System abstraction, one could implement a wide variety of "process features." Stated more generically, any mapping/permutation function can be applied to a process and its output and/or input.

The system 500 can invoke a representation of a process is complete and intentional. It is to be appreciated that an intentional representation of the process can be an important factor in order to allow the process to be manipulated. The system 500 can include various process features that can be utilized by an operating system to allow other processes and/or programs to manipulate and instrument processes in light of allowing any mapping/permutation being applied to a process and its input and/or output utilizing a complete and intentional representation of the process. By employing such process features, the system 500 can provide enhanced capabilities for security (e.g., running the process in a sandbox), virtualization, debugging, auditing, logging, reliability, etc.

Furthermore, the servicing component 102 can provide a redundancy-check. For example, upon the complete and intentional representation of a process, the servicing component 102 can employ most any suitable technique in order to ensure the integrity and/or accuracy of the process representation. By employing an accuracy check on the representation, the duplication of representation of process can be prevented, the spoof and/or modification of the representation of process can be prevented, and the representation of process is authenticated.

The servicing component 102 can also implement a timestamp associated with the complete and intentional representation of process. In other words, the servicing component 102 can provide a time and/or date in connection with when a portion of a process was represented. For example, portions of processes may be time-sensitive, wherein the representation of such processes can be associated with deadlines. Therefore, the servicing component 102 can provide a timestamp associated with portions of processes, wherein the system 500 can evaluate and employ complete and intentional representations of processes in accordance to such time-sensitive data.

Furthermore, the rollback techniques can allow rollback to a state associated with a point in the past. For example, the Operating System 302 can be at a first state associated with a first time, wherein the client 202 can initiate a request for a particular process. Based on such request, the servicing component 102 can analyze the process representations to determine that an error has occurred and the Operating System 302 can be rolled back to a state prior to the first state (and first time) so as avoid any complications associated with the detected error. Moreover, a roll-forward technique can be employed with the system 500. Thus, if the system 500 is rolled back to a previous state and/or point, the system 500 can be rolled forward to a point that is later than the previous state and/or point.

In still another example, the system 500 can utilize a multimachine redundancy technique/service that utilizes a majority vote for a corrective action. For instance, one or more machines can be executing a substantially similar process and/or application, wherein such one or more machines can provide a vote/recommendation for corrective action. Thus, the majority of votes/recommendations can be employed. In another example, the one or more machines can have varying priorities such that each machine's vote and/or recommendation can have weight associated therewith. In other words, although the majority may recommend a particular action, a disparate action and/or recommendation may be utilized based on including the priority of voting and/or recommendation.

The system 500 can further include a continuous component 504. The continuous component 504 allows an unimpeded execution of a request associated with client 202 regardless of a connectivity status, wherein connectivity status relates to the client 202 being logged in, logged out, in the process of logging in, in the process of logging out, etc. The continuous component 504 can ensure completion of a task and/or request associated with client 202 regardless of the client 202 being connected and/or communicating to the network service 108. For example, a request and/or task can be received by the network service 108, wherein the client 202 can disconnect (e.g., connection lost, client log out, client timed out, network service connection lost, etc.). However, the continuous component 504 can ensure the completion of such task and/or request such that upon re-connecting to the network service 108, the client can receive the completed task and/or request. In one example, a client can request that a certain item be searched for, and can then disconnect from the network service 108 (e.g., cloud, cloud service, network, service, etc.). Processes and/or applications within the network service 108, however, can continue to search for the item while the client is disconnected.

The servicing component 102 can further utilize a program isolation component 506 (depicted as the PI component within FIG. 5) that can isolate a program and/or data upon an identification of an error and/or mistake. In particular, the program isolation component 506 can isolate a portion of data and provide any suitable analysis therewith in order to determine the error and/or mistake. The portion of data can be isolated by the program isolation component 506 prior to execution and/or while running. The program isolation component 506 can also provide testing and/or analysis with the portion of data executing and/or not.

Figure 6:
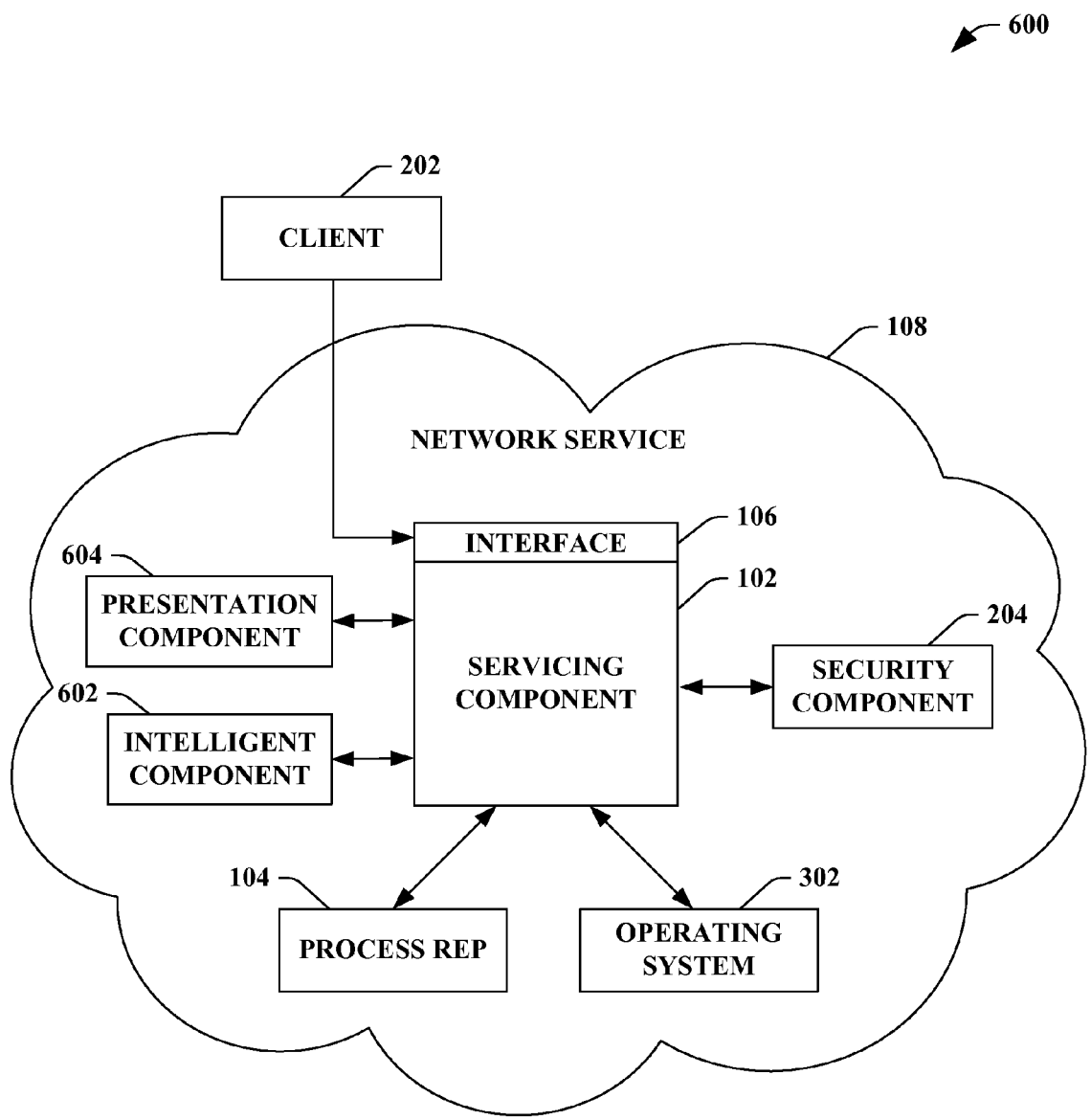
FIG. 6 illustrates a block diagram of an exemplary system that facilitates providing an Operating System with error reduction to a specific client within a network service.

FIG. 6 illustrates a system 600 that employs intelligence to facilitate providing an Operating System with error reduction to a specific client within a network service. The system 600 can include the servicing component 102, at least one process representation 104, the network service 108, security component 204, the Operating System 302, and the interface component 106, which can be substantially similar to respective components, services, process representations, Operating Systems, and interface components described in previous figures. The system 600 further includes an intelligent component 602. The intelligent component 602 can be utilized by the servicing component 102 to facilitate initiating and execution of an Operating System within a network service that has heightened security and error reduction characteristics. For example, the intelligent component 602 can infer data associated with process representation analysis, security details, errors, a portion of an error, an initiated process, a request, a user, a client, a setting associated with a client, an identification of a client, a correction to be implemented for a detected error, a rollback, whether a rollback is necessary, an Operating System that corresponds to a client, data related to an Operating System, a configuration associated with a client, a maintenance of a request regardless of a client login status, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The servicing component 102 can further utilize a presentation component 604 that provides various types of user interfaces to facilitate interaction between a user and most any component coupled to the servicing component 102. As depicted, the presentation component 604 is a separate entity that can be utilized with the servicing component 102. However, it is to be appreciated that the presentation component 604 and/or similar view components can be incorporated into the servicing component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the servicing component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
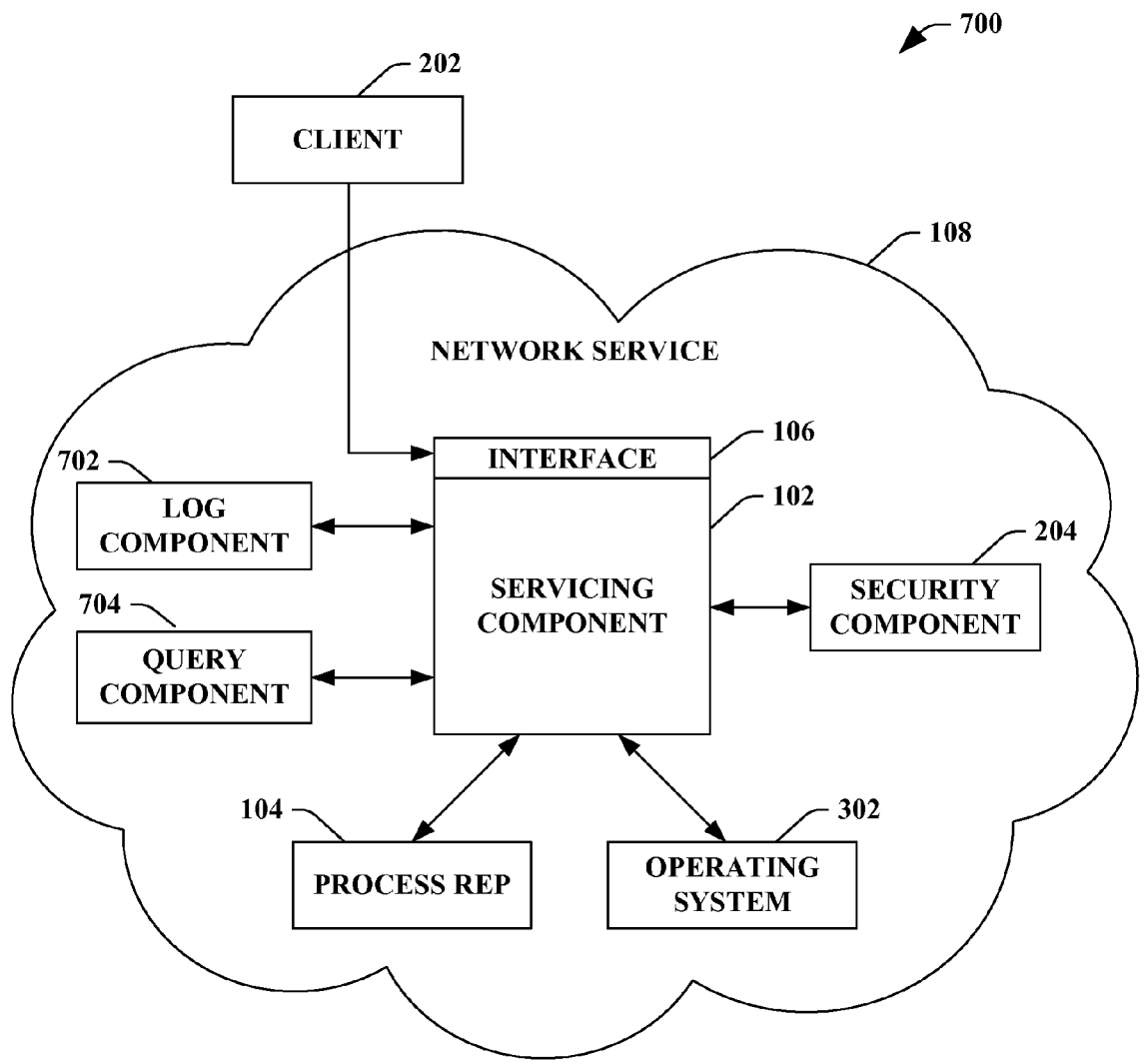
FIG. 7 illustrates a block diagram of an exemplary system that facilitates initiating and execution of an Operating System within a network service that has heightened security and error reduction characteristics.

FIG. 7 illustrates a system 700 that facilitates initiating and execution of an Operating System within a network service that has heightened security and error reduction characteristics. The system 700 can include a log component 702 that can work in conjunction with the servicing component 102, process representations 104, the network service 108, any existing network service (not shown), the interface component 106, the security component 204, Operating System 302, client 202, and/or any combination thereof in order to track any data related to the system 700. For instance, the log component 702 can track and/or record data related to Operating Systems 302, network services, user accounts, client data, Operating System settings, hardware configurations, security data, rollback data, transactional data, process data, process representation data, request and/or task data, etc. Moreover, the log component 702 can track various user data in connection with most any security and/or authorization utilized with the system 700. In such a case, the log component 702 can track which particular user initiated a connection with the network service 108 and/or the Operating System 302.

Moreover, the system 700 can include a query component 704 that allows the querying of such data stored and/or logged. In other words, the query component 704 can allow a user to search any data associated with the system 700. In particular, a process representation corresponding to an Operating System can be identified and/or any other data related thereto. Moreover, network services can be queried to locate data and/or Operating System (e.g., identifying the particular network service associated with a particular client 202). In still another example, the system 700 can be queried to locate a specific and/or particular client and/or clients.

The system 700 can further include a data store (not shown) that can include any suitable data related to the servicing component 102, process representations 104, the network service 108, the interface component 106, security component 204, the client 202, the Operating System 302, etc. For example, the data store that can include, but not limited to including, Operating System settings, hardware specifics, network service 108 configurations, applications settings, client data, user account information, security settings, user data, most any suitable data related to the client 202, network service 108, and/or the Operating System 302, etc. In one example, the servicing component 102 can store Operating System configurations and assignment data, wherein a particular client can log into the network service 108 and utilize the corresponding Operating System with user-specific characteristics.

It is to be appreciated that the data store can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store of the subject systems and methods is intended to comprise, without being limited to, these and any other suitable types of memory. In addition, it is to be appreciated that the data store can be a server, a database, a hard drive, and the like.

Figure 8:
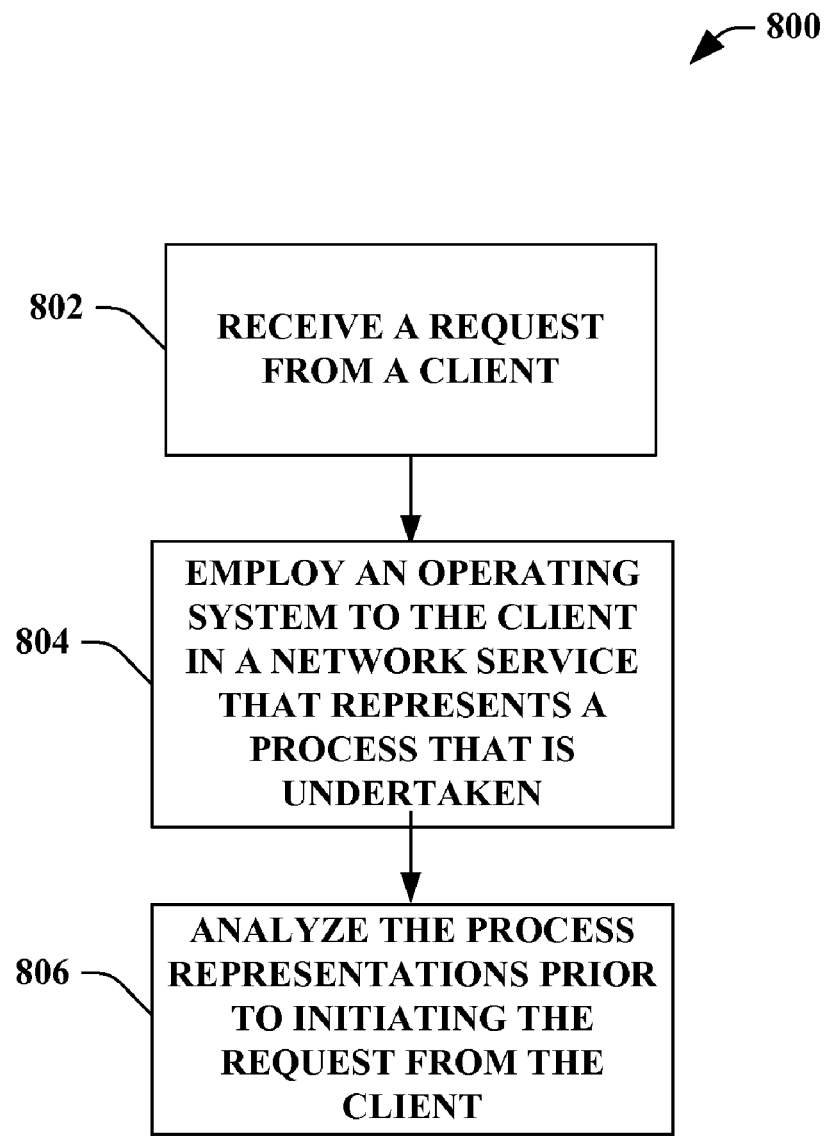
FIG. 8 illustrates an exemplary methodology for analyzing at least a portion of a process representation in any state to ensure error reduction associated with initiating and execution of a process within a network service.
Figure 9:
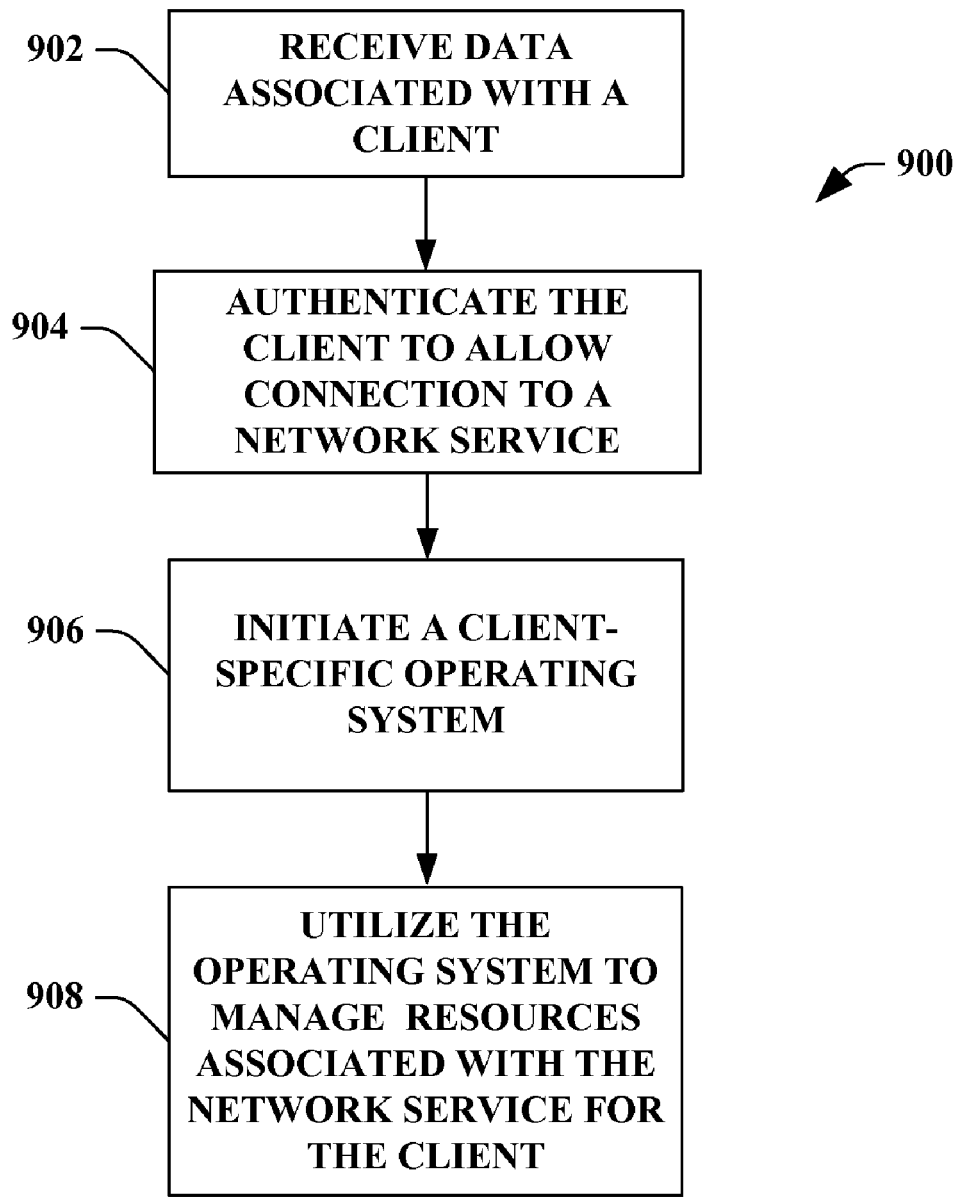
FIG. 9 illustrates an exemplary methodology for implementing a particular Operating System that corresponds to a client within a network service to manage hardware and software resources of the network service.
Figure 10:
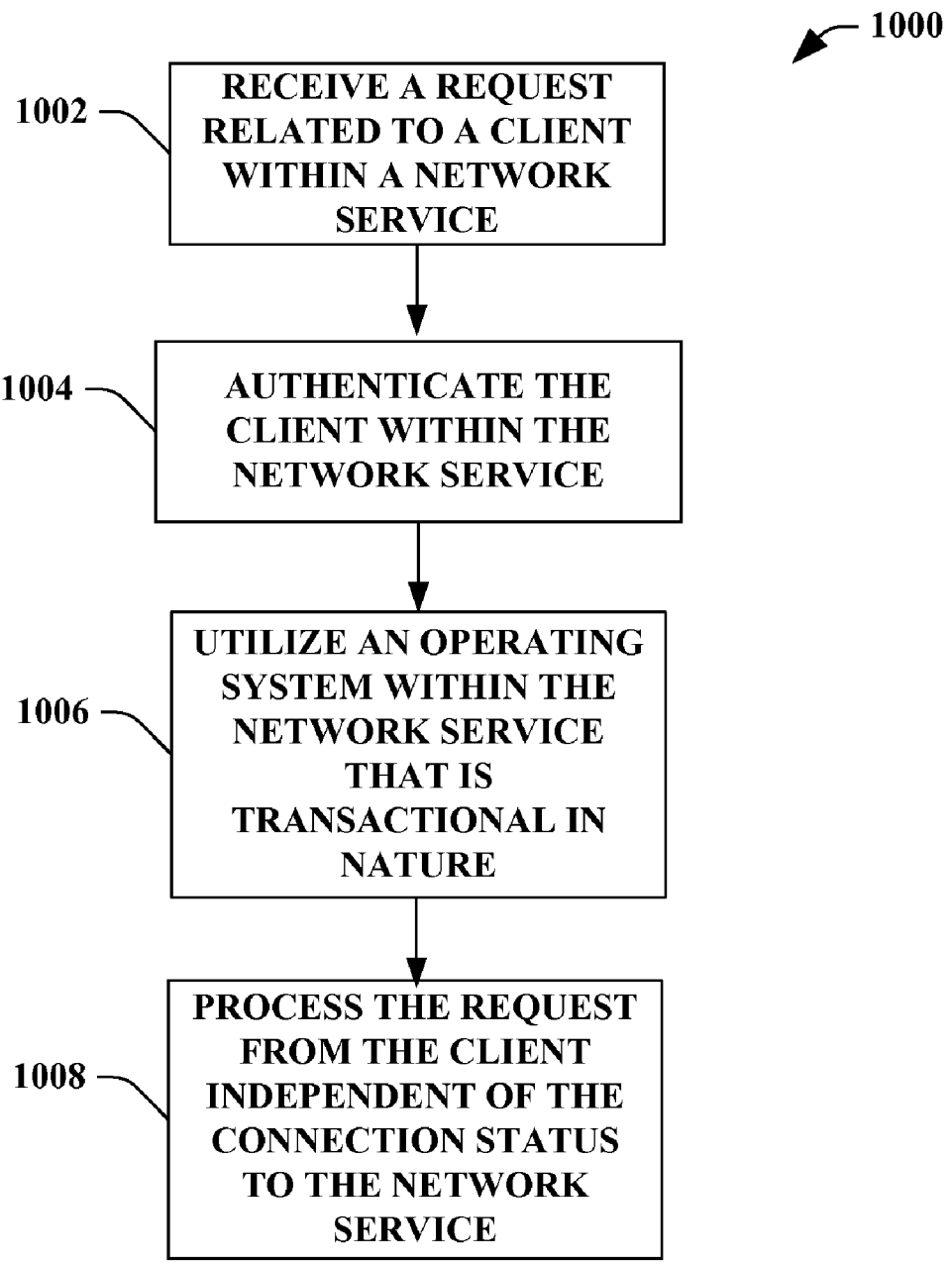
FIG. 10 illustrates an exemplary methodology that facilitates maintaining a process of a request independent of a client login status and utilizing a rollback mechanism for data within a network service.

FIGS. 8-10 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 for analyzing at least a portion of a process representation in any state to ensure error reduction associated with initiating and execution of a process within a network service. At reference numeral 802, a request can be received from a client. The client can be any suitable entity that is capable of communicating to a network service. For instance, the client can be, but is not limited to being, a user, a machine, a computer, a mobile device, etc. At reference numeral 804, an Operating System can be employed to the client within a network service, wherein the Operating System can represent a process that is undertaken within the network service. The Operating System can be robust to include intentional and complete representations of processes and entities within the network service and/or cloud. The representations can include representations of open connections, security contexts, processes, resources, etc. The Operating System can be any suitable software program that manages hardware and/or software resources associated with the network service. For example, the Operating System can perform basic tasks such as, but not limited to, controlling and allocating memory, prioritizing the processing of instructions, controlling input and/or output devices, facilitating networking, managing files and/or data, etc. Moreover, an Operating System can be employed to each client such that the Operating System is unique and specifically tailored accordingly within the network service.

At reference numeral 806, the process representations can be analyzed prior to the initialization of the request from the client. By analyzing any process representations associated within the network service related to the client, the network service can provide a highly sophisticated Operating System with heightened security and reduction of errors and/or complications. For instance, most other processes and their current and/or previous states can be analyzed prior to enabling a process/request to be initiated, thereby reducing errors that occur within the cloud and/or network service. Moreover, when an error and/or complication is identified and/or anticipated, the error and/or complication can be corrected, isolated, quarantined, repaired, rolled back, rolled forward, etc.

FIG. 9 illustrates a methodology 900 for implementing a particular Operating System that corresponds to a client within a network service to manage hardware and software resources of the network service. At reference numeral 902, data associated with a client can be received by a network service. In general, the network service can refer to any collection of resources that are maintained by a party (e.g., off-site, on-site, third party, etc.) and accessible by an identified user over a network (e.g., Internet, WAN, etc.). It is to be appreciated and understood that the network service is intended to include any service, network service, cloud service, collection of resources, etc. and can be accessed by an identified user via a network. Moreover, the network service can provide any suitable number of services and/or Operating Systems. In another example, the network service can be a cloud service that can include and/or utilize the services and/or Operating Systems.

At reference numeral 904, the client can be authenticated in order to allow connection to the network service. The client can be verified to allow the client to connect and/or establish a communication session with the network service ensuring the integrity of such client and any data associated therewith. The authentication can include any suitable identification data such as, usernames, passwords, personal data, account data, personal identification numbers, personal status, historical data, log in data, and the like. Furthermore, the authentication can verify a client and/or user by analyzing biometric indicia, such as voice recognition, fingerprint analysis, retina analysis, etc.

Based on the authentication of the client, at reference numeral 906, a client-specific Operating System can be initiated within the network service. For instance, the identified client can have a corresponding Operating System which has unique and/or client-specific characteristics such as applications, settings, configurations, data, hardware specifics, software specifics, input devices, output devices, system settings, account settings, client settings, network configurations, memory, etc. In other words, a plurality of clients can be associated with a network service, wherein each client can be authenticated and utilize a specific Operating System tailored for each client (based on, for instance, user-defined settings). At reference numeral 908, the Operating System can be utilized to manage resources associated with the network service for the client. For example, the Operating System can perform basic tasks such as, but not limited to, controlling and allocating memory, prioritizing the processing of instructions, controlling input and/or output devices, facilitating networking, managing files and/or data, etc. Moreover, the Operating System can utilize any prioritization of processes and/or process representations in order to provide efficient request execution, security, and/or error reduction.

FIG. 10 illustrates a methodology 1000 that facilitates maintaining a process of a request independent of a client login status and utilizing a rollback mechanism for data within a network service. At reference numeral 1002, a request related to a client can be received within a network service. At reference numeral 1004, the client and/or request can be authenticated to ensure integrity and validity within the network service. It is to be appreciated that the client can be verified to allow the client to connect and/or establish a communication session with the network service ensuring the integrity of such client and any data associated therewith. The authentication can include any suitable identification data such as, usernames, passwords, personal data, account data, personal identification numbers, personal status, historical data, log in data, and the like. Furthermore, the authentication can verify a client and/or user by analyzing biometric indicia, such as voice recognition, fingerprint analysis, retina analysis, etc.

At reference numeral 1006, an Operating System within the network service can be utilized, wherein the Operating System can be transactional in nature. In other words, data, processes, and the like can be rolled back to a previous and/or future state. Thus, the Operating System employed by the network service can be transactional and allow any suitable rollback mechanism and/or technique to be implemented. For instance, a portion of process representations can be analyzed to identify an error and/or possible error, the Operating System can be rolled back to a state that allows such identified error to be validated, corrected, isolated, ignored, etc. In another example, the Operating System can be rolled forward to a state to allow the system to avoid an identified anticipated error.

At reference numeral 1008, the request from the client can be processed independent of the connection status to the network service. Thus, an unimpeded execution of a request associated with the client can be provided regardless of a connectivity status, wherein the connectivity status relates to the client being logged in, logged out, in the process of logging in, in the process of logging out, connected to the network service, utilizing a communication session with the network service, etc. By implementing an unimpeded approach, the completion of a task and/or request can be ensured regardless of the client being connected and/or communicating to the network service.

Figure 11:
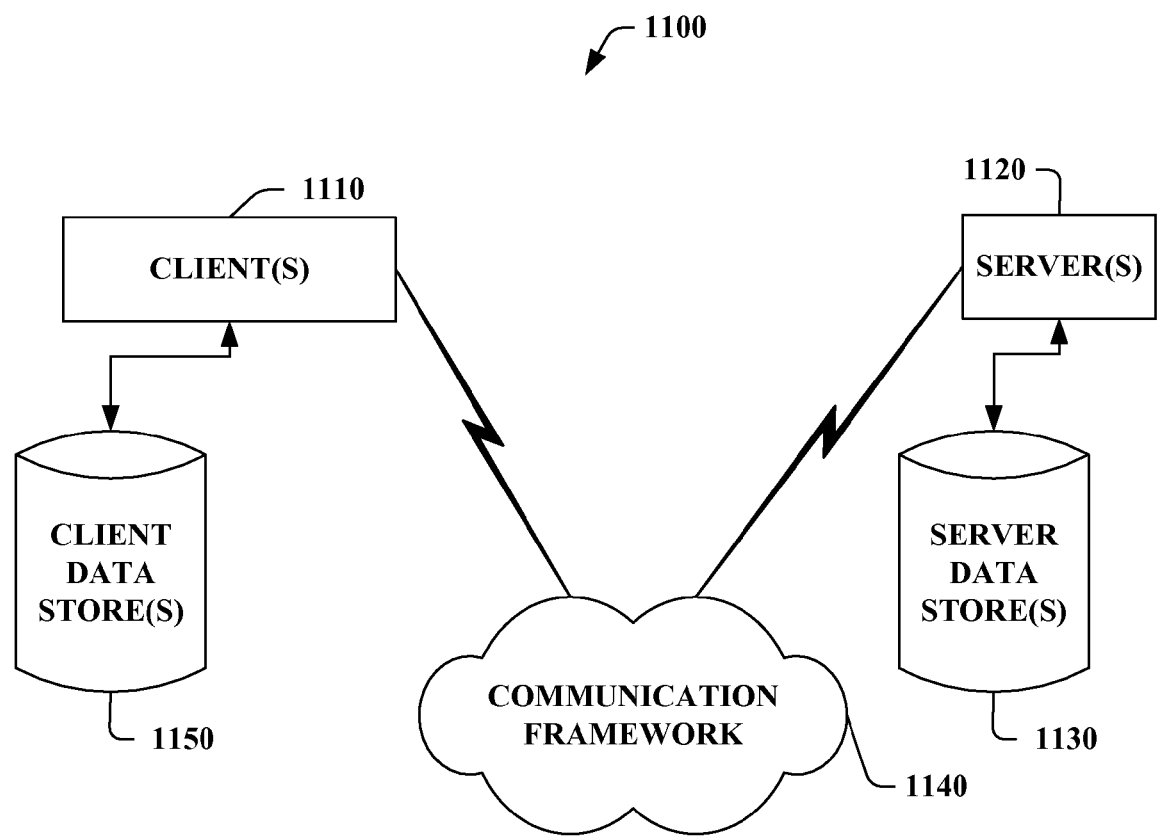
FIG. 11 illustrates an exemplary networking environment, wherein the novel aspects of the claimed subject matter can be employed.
Figure 12:
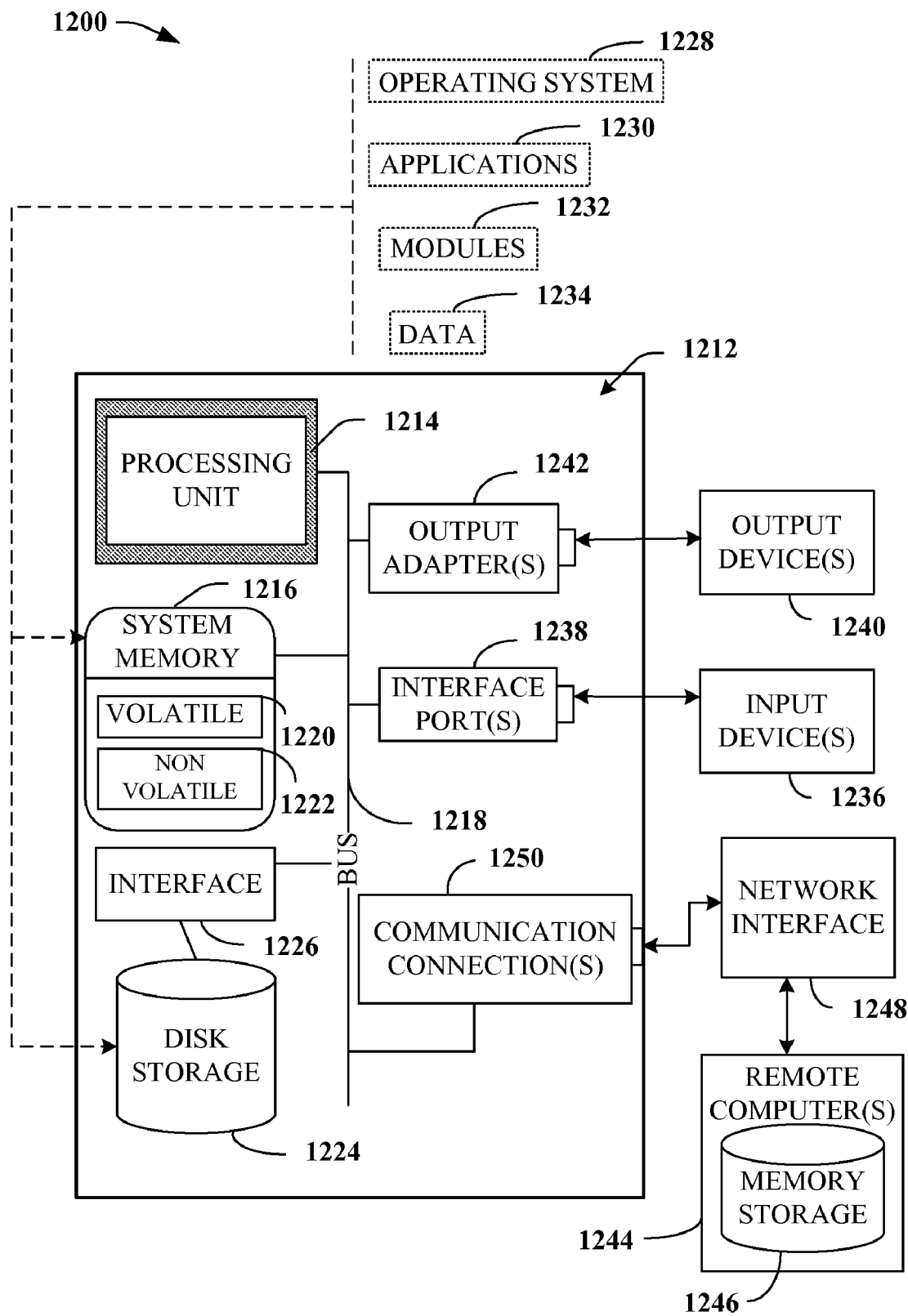
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a servicing component that facilitates at least one of reducing errors associated with initializing a process, incorporating an Operating System for a client and/or user within a network service, implementing a rollback mechanism related to applications, and maintaining the process of a request independent of client login status as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1140 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1294), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates isolating a portion of a process associated with a network service, the system comprising:
    an interface that receives a request to initialize and execute a portion of data within a network service; and
    a servicing component that analyzes the portion of data within the network, the portion of data represents at least a portion of a process representation, the process operates within the network service, the network service provides services for each of a plurality of clients, each client utilizes its own client-specific operating system incorporated into the network service, the client-specific operating system has client-specific characteristics, and the operating system includes at least one complete representation of a portion of the process.

2. The system of claim 1, the client specific operating system is a software program that manages at least one of a hardware resource and a software resource associated with the network service, and wherein the client-specific operating system is initiated within the network service.

3. The system of claim 1, the servicing component detects an error related to the portion of data within the network service, the system further comprising a program isolation component that isolates the portion of data with the detected error within the network from error-free portions of data within the network service.

4. The system of claim 3, the servicing component detects the error related to the portion of data during at least one of a time prior to execution of the portion of data and a time during execution of the portion of data, and the servicing component provides a redundancy check on the process representation to ensure integrity or accuracy.

5. The system of claim 3, the program isolation component executes the portion of data with the detected error in an isolated environment to evaluate the detected error, and wherein a user has a first set of rights with respect to the portion of data in a first state of the operating system and a second set of rights with respect to the portion of data in a second state of the operating system.

6. The system of claim 3, the program isolation component corrects the detected error associated with the portion of data based at least in part upon the evaluation and releases the portion of data out of isolation, wherein the detecting of the error is performed by an intelligent component that is a support vector machine (SVM) that finds a hypersurface in a space of possible inputs related to the portion of data.

7. The system of claim 3, the servicing component executes the portion of data with the detected error with a corrective action which is at least one of a reduced functionality, a downgraded functionality, a reduced state, and a lower priority; and
    each service for each user is run in multiple copies where if the multiple copies for a given service agree the service continues, and if no agreement is established for the given service a corrective action is taken.

8. The system of claim 7, the servicing component detects a potential error with the portion of data and monitors such potential error while the portion of data is executing in an isolated environment within the network service, and each of the multiple copies of each service has its own weight.

9. The system of claim 8, at least one of the detected error related to the portion of data and the potential error with the portion of data is corrected by at least one of a roll back, a roll forward, a quarantine, an isolation, a repair, a deletion of error-related data, a reduced functionality, a multi-machine redundancy technique that provides a recommended action, and an ignore action.

10. The system of claim 9, the multi-machine redundancy technique provides a plurality of machines running independently, wherein each machine recommends an action associated with the portion of data.

11. The system of claim 10, the servicing component implements the recommended action based on a majority of the plurality of machines.

12. The system of claim 10, each of the plurality of machines includes at least one of a priority and a weight.

13. The system of claim 12, the servicing component implements the recommended action based on the majority of at least one of a weight of the plurality of machines and a priority of machines.

14. A computer-implemented method that facilitates detecting an error related to portion of data within a network service, the method comprising:
- receiving a request associated with initializing and executing a portion of data from a client within a network service, the request from the client is processed independently of a connection status of the client to the network service;
- representing a portion of a process with the portion of data by inferring a probabilistic state through the use of a support vector machine; and
- analyzing the portion of data within the network service to detect at least one of an error and a potential error.

15. The method of claim 14, further comprising:
- analyzing, by a support vector machine, the portion of data prior to execution to detect at least one of the error and the potential error by finding a hypersurface in a space of possible inputs associated with the portion of data; and
- analyzing the portion of data during execution to detect at least one of the error and the potential error.

16. The method of claim 14, further comprising:
- isolating the portion of data associated with at least one of the error and the potential error from at least one of data free of an error and data free of a potential error;
- evaluating the isolated portion of data during execution; and
- repairing the portion of data based on the evaluation.

17. The method of claim 14, further comprising a multi-machine redundancy technique that includes a plurality of machines running the portion of data independently and each machine provides a recommended action related to the portion of data.

18. A computer-implemented system that facilitates isolating a portion of a process associated with a network service, the system comprising:
- means for receiving a request to initialize and execute a portion of data within a network service, wherein the request is processed independently of a connection status to the network service;
- means for analyzing the portion of data within the network using a client-specific operating system incorporated into the network service, the portion of data represents at least a portion of a process; and
- means for isolating the portion of data based at least in part upon one of a detected error and a detected potential error.

19. The system of claim 1, the system further comprising a security component that ascertains which services related to the network service are authorized to execute for each of the plurality of clients.

20. The system of claim 19 wherein the security component granularly performs security with respect to each user as to a portion of the network service and a corresponding collection of services provided to each user.

* * * * *